(12) United States Patent
Vinarcik et al.

(10) Patent No.: US 12,158,331 B2
(45) Date of Patent: Dec. 3, 2024

(54) SYSTEMS AND METHODS FOR FABRICATED PART MEASUREMENT

(71) Applicant: Hydro Extrusion USA, LLC, Rosemont, IL (US)

(72) Inventors: Edward J. Vinarcik, West Lafayette, IN (US); Michael Zajac, Dickson, TN (US); Daniel Biorn, Yankton, SD (US)

(73) Assignee: HYDRO EXTRUSION USA, LLC., Rosemont, IL (US)

( * ) Notice: Subject to any disclaimer, the term of this patent is extended or adjusted under 35 U.S.C. 154(b) by 391 days.

(21) Appl. No.: 17/572,082

(22) Filed: Jan. 10, 2022

(65) Prior Publication Data

US 2023/0092686 A1 Mar. 23, 2023

Related U.S. Application Data

(60) Provisional application No. 63/245,602, filed on Sep. 17, 2021.

(51) Int. Cl.
*G01B 11/02* (2006.01)
*G01C 3/08* (2006.01)
*G01S 17/48* (2006.01)

(52) U.S. Cl.
CPC ............... *G01B 11/02* (2013.01); *G01C 3/08* (2013.01); *G01S 17/48* (2013.01)

(58) Field of Classification Search
CPC ........ G01C 3/08; G01C 15/00; G01B 5/0004; G01B 5/02; G01B 11/02; G01S 17/08; G01S 17/48
See application file for complete search history.

(56) References Cited

U.S. PATENT DOCUMENTS

| | | | |
|---|---|---|---|
| 6,373,579 B1 | 4/2002 | Ober | |
| 8,400,619 B1 * | 3/2013 | Bachrach | G01C 1/04 356/4.1 |
| 9,239,227 B1 | 1/2016 | Lin | |
| 2010/0201972 A1 | 8/2010 | Marsh | |
| 2014/0059981 A1 | 3/2014 | Pettersson | |

(Continued)

FOREIGN PATENT DOCUMENTS

CN 110095768 A 8/2019

OTHER PUBLICATIONS

Kanamori et al "Volume-Measuring Method and Volume-Measuring Instrument", Mar. 10, 2005, JP2005061886A (Year: 2005).*

(Continued)

*Primary Examiner* — Sang H Nguyen
(74) *Attorney, Agent, or Firm* — Wenderoth, Lind & Ponack, L.L.P.

(57) ABSTRACT

A system for measuring a length of a work piece including a leveling fixture disposed at a first end of the work piece and a range target disposed at a second end. The leveling fixture includes a precision stop abutting against the first end and range finders configured to be substantially aligned with the first end. The range target includes a target stop abutting against the second end and a vertical portion substantially aligned with the second end when the target stop abuts the second end. The range finders are each configured to take measurements between the range finders and the vertical portion of the range target so as to provide a measurement of the length of the work piece.

6 Claims, 7 Drawing Sheets

(56) References Cited

U.S. PATENT DOCUMENTS

2019/0301863 A1 10/2019 Hill
2020/0132838 A1* 4/2020 McGill ................ G01C 15/008

OTHER PUBLICATIONS

Kamiyama et al "Collimation Device of Transmission Type Photo-electric Sensor", Sep. 8, 2002; JP2002222986A (Year: 2002).*
International Search Report and Written Opinion issued in App. No. PCT/IB2022/058750, mailing date Dec. 20, 2022, 18 pages.

* cited by examiner

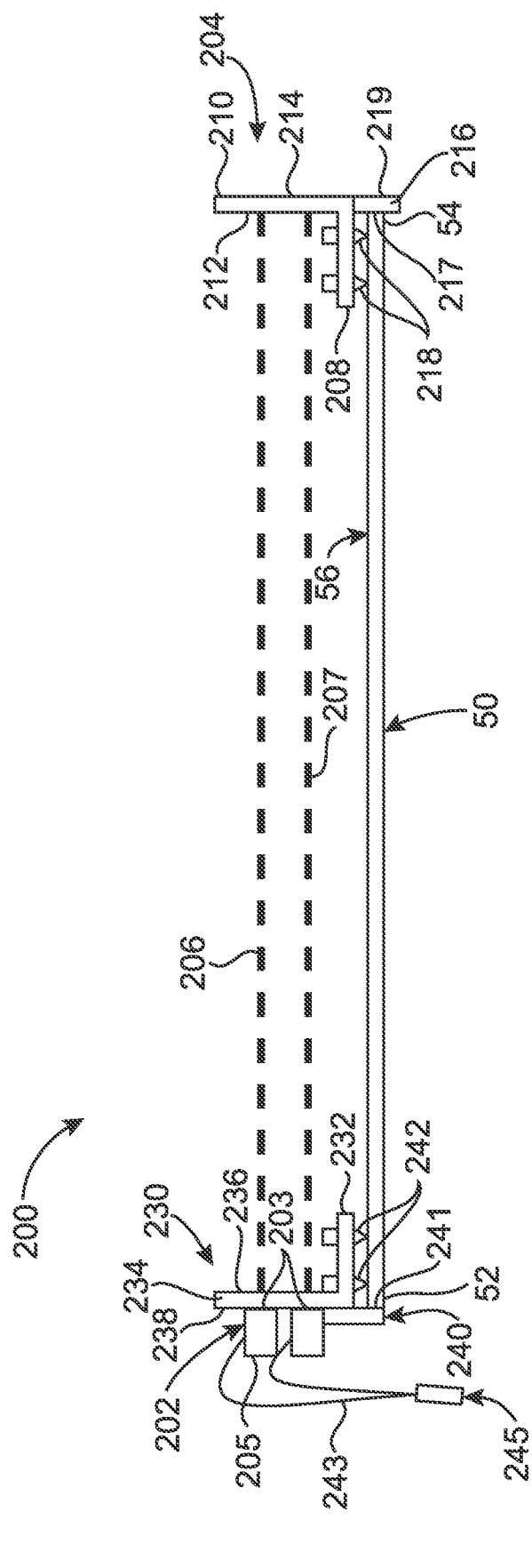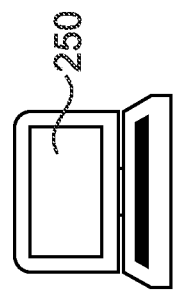
FIG. 2

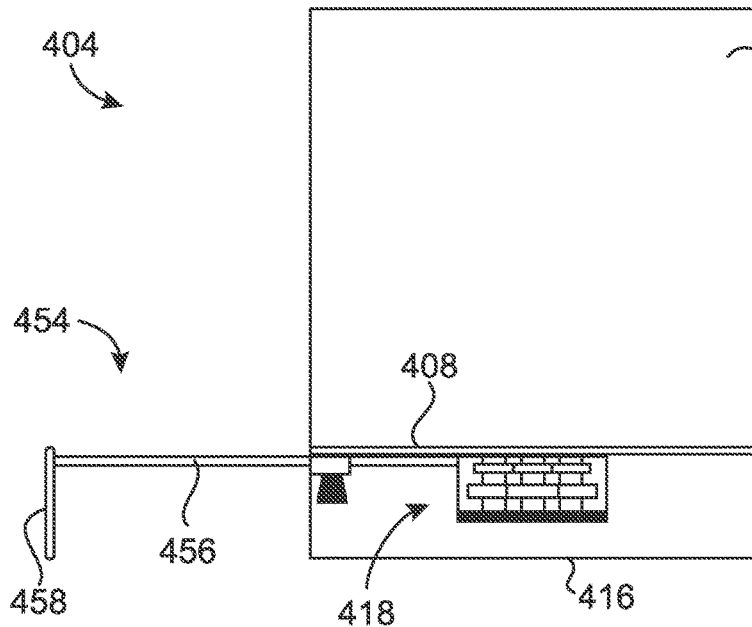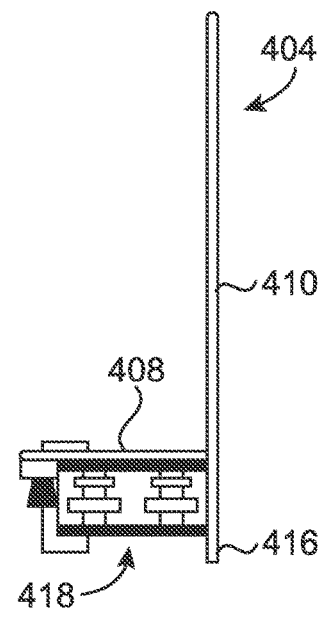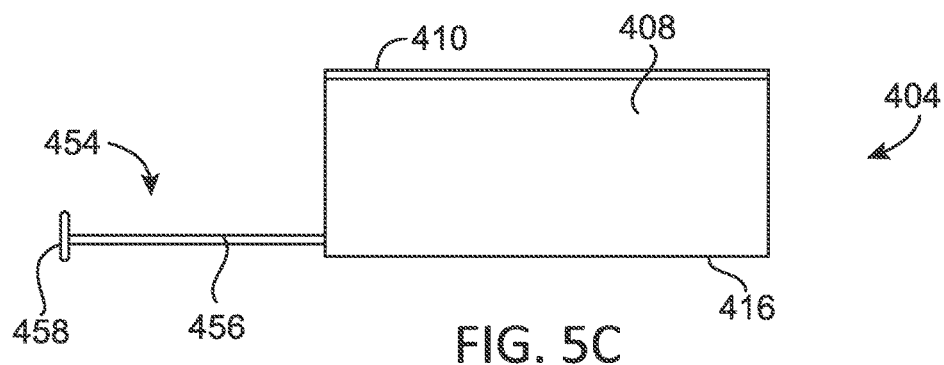

SYSTEMS AND METHODS FOR FABRICATED PART MEASUREMENT

CROSS-REFERENCE TO RELATED APPLICATIONS

This application claims priority to U.S. Provisional Application No. 63/245,602, filed Sep. 17, 2021, the entirety of which is incorporated by reference herein.

TECHNICAL FIELD

The present disclosure relates generally to the field of manufacturing and fabrication and, more specifically, to the measurement of fabricated work pieces.

BACKGROUND

In manufacturing components for use in assembly, construction, or other manufacturing processes, it may be important to provide parts with precise measurements. Tools and methods are needed to more accurately and efficiently measure manufactured components within reliable tolerances.

SUMMARY

In an embodiment, the disclosure describes a system for measuring a length of a work piece. The system may include a leveling fixture configured to be disposed at a first end of the work piece. The leveling fixture may include a precision stop configured to abut against the first end of the work piece and one or more range finders configured to be substantially aligned with the first end of the work piece when the precision stop abuts the first end of the work piece. The system may also include a range target configured to be disposed at a second end of the work piece. The range target may include a target stop configured to abut against the second end of the work piece and a vertical portion configured to be substantially aligned with the second end of the work piece when the target stop abuts the second end of the work piece. The one or more range finders may each be configured to take measurements between the one or more range finders and the vertical portion of the range target when the precision stop is abutting the first end of the work piece and the target stop is abutting the second end of the work piece so as to provide a measurement of the length of the work piece.

In another embodiment, the disclosure describes a system for measuring a length of a work piece. The system may include a leveling fixture configured to be disposed at a first end of the work piece. The leveling fixture may include a precision stop configured to abut against the first end of the work piece and one or more range finders each configured to take measurements with respect to the first end of the work piece when the precision stop abuts the first end of the work piece. The leveling fixture may also include a fixture adjustment arm configured to abut an edge of the work piece that is substantially perpendicular to the first end. The system may also include a range target configured to be disposed at a second end of the work piece. The range target may include a target stop configured to abut against the second end of the work piece, a vertical portion configured to be substantially aligned with the second end of the work piece when the target stop abuts the second end of the work piece, and a target adjustment arm configured to abut an edge of the work piece that is substantially perpendicular to the second end. The one or more range finders may each be configured to take distance measurements between the first end and the second end of the work piece to measure the length of the work piece.

In another embodiment, the disclosure describes a system for measuring a length of a work piece. The system comprising a leveling fixture configured to be disposed at a first end of the work piece. The leveling fixture may include a horizontal portion, a vertical portion extending substantially perpendicularly from the horizontal portion, a precision stop extending substantially perpendicularly from the horizontal portion and configured to abut against the first end of the work piece, one or more range finders mounted to at least one of the vertical portion and the horizontal portion, and a fixture adjustment arm configured to abut an edge of the work piece that is substantially perpendicular to the first end. The system may include a range target configured to be disposed at a second end of the work piece. The range target may include a horizontal portion, a target stop extending substantially perpendicularly from the horizontal portion and configured to abut against the second end of the work piece, a vertical portion extending substantially perpendicularly from the horizontal portion and configured to be substantially aligned with the second end of the work piece when the target stop abuts the second end of the work piece, and a target adjustment arm configured to abut an edge of the work piece that is substantially perpendicular to the second end. The system may also include a computing device that may be in wireless communication with the one or more ranger finders, and the one or more range finders may be configured to transmit measurements to the computing device. The one or more range finders may each be configured to take distance measurements between the first end and the second end of the work piece to measure the length of the work piece, and the computing device may be configured to receive the distance measurements from each of the one or more range finders and determine an average length of the work piece based on the distance measurements.

BRIEF DESCRIPTION OF THE DRAWINGS

Non-limiting and non-exhaustive embodiments are described in reference to the following drawings. In the drawings, like reference numerals refer to like parts through all the various figures unless otherwise specified.

For a better understanding of the present disclosure, a reference will be made to the following detailed description, which is to be read in association with the accompanying drawings, wherein:

FIG. 2 shows an embodiment of a fabricated part measurement system with multiple range finders as shown and described herein;

FIG. 5A shows a front elevation view of another embodiment of a range target of a fabricated part measurement system as shown and described herein;

FIG. 5B shows a side elevation view of the range target of FIG. 5A;

FIG. 5C shows a top view of the range target of FIG. 5A;

DETAILED DESCRIPTION

Figure 1:
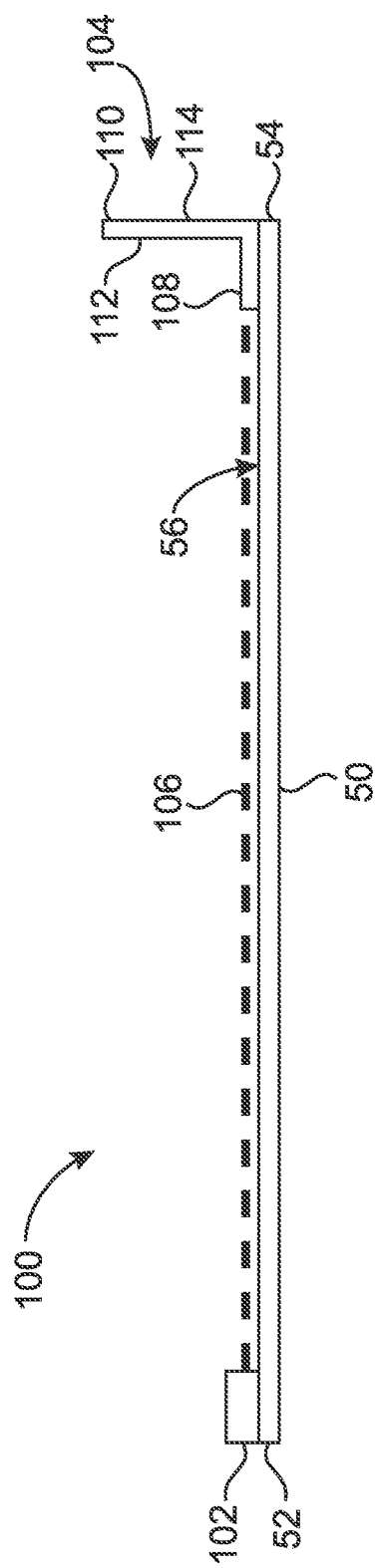
FIG. 1 shows an embodiment of a fabricated part measurement system with a single range finder as shown and described herein.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of entirely a hardware embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, although it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and includes plural references. The meaning of "in" includes "in" and "on."

The present disclosure describes, in some embodiments, systems and methods for more precisely, efficiently, reliably and accurately measuring extruded parts or parts made via various manufacturing processes. The disclosed systems and methods may be particularly useful in relatively long-length parts, such as fabricated parts that may be cut to a specific, desired length, where the accuracy and efficiency of traditional measurement tools may be lacking. Some industry participants or customers may request tolerances or precision for extruded or other components that may not be deliverable or may be inefficient and/or time consuming using traditional measurement techniques. For example, in some industries, an extruded component may ideally have length tolerance of +−0.125" (although other tolerances are contemplated). Existing measurement tools may often fall short of industry standards for gage repeatability and reproducibility ("gage R&R"), such as a gage R&R of below 20% or preferably below 10% in some applications.

To address these and other issues, the present disclosure describes, in some embodiments, systems and methods for measuring fabricated part length using one or more range finders and one or more range targets. Some advantages of the disclosed measurement system may be that the system provides accurate, reliable, and reproducible measurements of extruded parts or parts created using other manufacturing processes. The components of the system may be easily portable so that measurements may be made quickly and removed for use on another part, which may increase measurement efficiency and provide for overall higher manufacturing output. Additionally, the system may be transported easily from site to site, or to various locations within a work site as desired. Another advantage of the disclosed measurement systems may be that cycle time to measure a given part may be significantly reduced as compared to traditional measurement processes, providing for more efficient measurements and more measurements made within a given time period. Those skilled in the art will readily recognize additional advantages to the disclosed measurement system in view of the disclosure.

FIG. 1 illustrates one embodiment of a fabricated part measurement system 100 for measuring a fabricated part 50 including a first end 52 and a second end 54. The fabricated part 50 may be made using one of various types of fabrication methods, such as extruding, forging, injection molding, casting, etc. The system 100 may include a range finder 102 disposed on the first end 52 of the fabricated part 50 and a range target 104 disposed on the second end 54 of the fabricated part. In some embodiments, the range finder 102 may be a laser range finder disposed so as to emit a laser against the range target 104. In some embodiments, the range finder may be another suitable type of range finder, such as using optical triangulation, a sonic ranger finder, etc. In some embodiments, the range finder 102 may be mounted on the fabricated part 50 so that any length measurement taken by the range finder may have an origin point at the first end 52 of the fabricated part. The process of mounting the range finder 102 in such a manner may vary per range finder design but, in some embodiments, the range finder may be mounted such that an end of the range finder may be substantially flush with the first end 52 of the fabricated part. In some embodiments, the range finder 102 may not necessarily be flush with the first end 52 of the fabricated part 50, but may be disposed on the fabricated part with a known offset distance or length that may be taken into account when determining the length of the fabricated part in view of a range measurement. In any event, the range finder 102 may be mounted so as to measure length from a desired first reference point/end of the fabricated part 50 or other work piece.

In some embodiments, the range target 104 may be mounted on the fabricated part 50 such that the measurement taken by the range finder 102 may have a termination point at the second end 54 of the fabricated part 50 or other work piece. The range target 104 may have various embodiments consistent with the scope of the disclosure. The embodiment of the range target 104 illustrated in FIG. 1 includes a horizontal portion 108 and a vertical portion 110 that is substantially perpendicular to the horizontal portion. In some embodiments, the vertical portion 110 of the range target 104 may be disposed on the fabricated part 50 so as to be substantially flush with the second end 54 of the fabricated part, and the horizontal portion 108 may be disposed on the fabricated part so as to be substantially flush with a top portion 56 of the fabricated part.

In some embodiments, a measurement may be taken by the range finder 102 from the first end 52 of the fabricated part 50 to the ranger target 104 disposed at the second end 54. In embodiments using a laser range finder, the range finder 102 may emit a laser beam 106 against the range target 104. In some embodiments, the laser beam 106 may be aligned so as to measure the distance to the vertical portion 110 of the range target 104. In some embodiments, when the horizontal portion 108 of the range target 104 may be substantially flush with a flat top portion 56 of the fabricated part and when the vertical portion 110 may be substantially perpendicular to the horizontal portion, a measurement taken to the vertical portion flush against the second end 54 of the fabricated part may be an accurate representation of the fabricated part's length. In some embodiments, the vertical portion 110 of the range target 104 may have a known target thickness measured between a front surface 112 of the vertical portion 110 and a back surface 114 of the vertical portion. In some embodiments, if the back surface 114 is aligned substantially flush with the second end 54 of the fabricated part 50 and the range finder 102 may be incident upon the front surface 112 of the vertical portion 110, then the target thickness may be taken into account when determining the resulting length measurement of the fabricated part 50. In some embodiments, a measured length of the fabricated part 50 may be the distance measured by the range finder 102 incident upon the front surface 112 of the vertical portion 110 plus the target thickness measured between the front surface 112 and the back surface 114. In some embodiments, the range target 104 may be disposed on the fabricated part 50 such that the front surface 112 of the vertical portion 110 may be substantially aligned with the second end 54 of the fabricated part. In such embodiments, the distance measured from the first end 52 of the fabricated part 50 to the front surface 112 of the vertical portion 110 may represent an accurate measurement of the fabricated part length.

FIG. 2 illustrates another embodiment of a fabricated part measurement system 200 for efficiently determining an accurate length of an fabricated part 50 having a first end 52 and a second end 54. The system 200 may include one or more range finders 202 that may be mounted on or otherwise connected to a leveling fixture 230 that may be disposed on the first end 52 of the fabricated part 50 to be measured. In some embodiments, the range finder 202 may be a laser range finder disposed so as to emit a laser against the range target 204. The embodiment illustrated in FIG. 2 includes at least two range finders 202 disposed adjacent one another either vertically, horizontally, or otherwise. In some embodiments, the range finders 202 may each emit a laser beam 206, 207 or other type of range finding signal, pulse, wave, etc., that may be targeted to land upon a range target fixture 204 disposed at the second end 54 of the fabricated part 50 and thus provide a relatively precise and accurate measurement of a length of the fabricated part between the first end 52 and the second end 54.

In some embodiments, the leveling fixture 230 may be substantially L-shaped and include a horizontal portion 232 and a vertical portion 234 substantially perpendicular to the horizontal portion. The vertical portion 234 of the leveling fixture 230 may include a front surface 236 and a back surface 238 and may have a leveling fixture thickness measured between the front surface 236 of the vertical portion of the leveling fixture and the back surface 238 of the vertical portion. In some embodiments, the leveling fixture 230 may also include a precision stop 240 to help align the leveling fixture in a horizontal plane. At least a portion of the precision stop 240 may be disposed against the back surface of the vertical portion 234 of the leveling fixture. Another, distal portion of the precision stop 240 may extend downward from the vertical portion 234 so as to extend further downward than the horizontal portion 232 and adjustment feet 242 and provide a stop surface 241 configured to abut the first end 52 of the fabricated part 50. In some embodiments, the stop surface 241 may abut both the back surface 238 of the vertical portion 234 of the leveling fixture 230 and the first end 52 of the fabricated part so as to place them in the same vertical plane and to substantially align the back surface 238 and the first end 52 with respect to a horizontal plane perpendicular to the vertical plane, i.e., a plane parallel to a top surface 56 of the fabricated part 50.

In some embodiments, the range finders 202 may be mounted to the leveling fixture 230 or otherwise aligned with respect to the leveling fixture such that emitting ends 203 of each range finder may be substantially aligned with the back surface 238 of the vertical portion 234 of the leveling fixture 230. If, in some embodiments, the range finder 202 may make measurements with respect to a rear end 205 of the range finder instead of the emitting end 203, the range finders may be aligned with respect to the leveling fixture 230 such that the rear ends 205 may be substantially aligned with the back surface 238 of the vertical portion 234 or otherwise substantially aligned with the first end 52 of the fabricated part 50. Alternatively, in some embodiments, the range finders 202 may be positioned so as to be horizontally offset from the back surface 238 and/or the first end 52 of the fabricated part 50 by a known amount that may be taken into consideration when determining a length measurement of the fabricated part.

The horizontal portion 232 of the leveling fixture 230 may include a plurality of adjustment feet 242 that may be disposed through the horizontal portion and may be independently and/or collectively adjustable so as to raise, lower, and/or level the leveling fixture with respect to the top surface 56 of the fabricated part 50. The adjustment feet 242 may be threaded to be adjustable by twisting, or by another suitable adjusting method. In some embodiments, the adjustment of the adjustment feet 242 may be automatic and/or may be manual. In some embodiments that include automatic adjustment, a computing device or controller may electronically communicate with the range finder 202 and the adjustment feet to automatically adjust the adjustment feet until the range finders may be properly positioned with respect to the range target 204. For example, in some embodiments, the adjustment feet 242 may be systematically adjusted vertically, horizontally, or both until a minimum range is measured, indicating that the range finders 202 may be properly targeted. In some embodiments, the horizontal portion 232 may include two, three, four, or more adjustment feet 242 to provide the desired control over the orientation of the leveling fixture 230 and, accordingly, the direction in which the range finding beams 206, 207 may be emitted by the range finders 202. In some embodiments, when the leveling fixture 230 is mounted properly on an fabricated part 50, the range finders 202 may be positioned such that the beams 206, 207 may be substantially parallel to the fabricated part surface 56 and substantially perpendicular to a cut face at the first end 52 of the fabricated part.

The range finders 202 may include a remote trigger 245 that may electronically communicate with the range finders via one or more cables 243 or may be configured to communicate with the range finders wirelessly, such as via Bluetooth, RFID, WiFi, NFC, or other suitable wireless communication technology. In some embodiments, remote triggering of the range finders 202 may provide for reduced or eliminated mechanical vibration or shaking of the range finders when a measurement is to be triggered and may produce more accurate measurements. In some embodiments, each range finder 202 may have its own dedicated remote trigger 245, or in other embodiments a single remote trigger may be configured to trigger a measurement from each range finder substantially simultaneously or in quick succession.

In some embodiments, the range target 204 may include a horizontal portion 208 and a vertical portion 210 that may be substantially perpendicular to the horizontal portion. The vertical portion 210 of the range target 204 may include a front surface 212 and a rear surface 214 and may have a range target thickness measured between the front surface and the rear surface. Similar to the leveling fixture 230, the horizontal portion 208 of the range target 204 may include a plurality of adjustment feet 218 that may be disposed through the horizontal portion 208 and may be independently and/or collectively adjustable so as to raise, lower, and/or level the range target with respect to the top surface 56 of the fabricated part 50. The adjustment feet 218 may be threaded to be adjustable by twisting, or by another suitable adjusting method. In some embodiments, the horizontal portion 208 may include two, three, four, or more adjustment feet 218 to provide the desired control over the orientation of the range target 204. In some embodiments, when the range target 204 is mounted properly on an fabricated part 50, the vertical portion 210 of the range target 204 may be substantially perpendicular to the fabricated part surface 56 and substantially parallel to a cut face at the second end 54 of the fabricated part.

The range target 204 may also include a target stop 216 that may be used to help align the range target 204 with reference to the horizontal plane substantially parallel to the top surface 56 of the fabricated part 50 by abutting against the second end 54 of the fabricated part. In some embodiments, the target stop 216 may have a target stop thickness measured between a stop surface 217 and an alignment surface 219 that may be substantially equal to the range target thickness. The target stop 216 may extend downward from the horizontal portion 208 in a direction opposite the vertical portion 210 and the stop surface 217 may be substantially aligned with reference to the horizontal plane with the front surface 212 of the vertical portion 210 of the range target 204. In other words, the stop surface 217 may be aligned with the front surface 212 such that the surfaces may be in the same vertical plane as one another. In such embodiments, when the stop surface 217 abuts against the second end 54 of the fabricated part, the front surface 212 of the vertical portion 210 of the range target 204 may be substantially aligned with the second end 54 of the fabricated part 50 and act as a proxy for the horizontal position of the second end. Accordingly, in some embodiments, when the system 200 is in place on a fabricated part, the range finding beams 206, 207 or other distance measurement may be targeted upon the front surface 212 of the range target 204 in order to measure the distance from the first end 52 and the second end 54 of the fabricated part 50.

The system 200 may also include a computing device 250, such as a desktop or laptop computer, tablet, smartphone, etc. The computing device 250 may be physically configured according to computer executable instructions. In some embodiments, the processor can be specially designed or configured to optimize communication between a range finder or other components relating to the fabricated part measurement system described herein. The computing device 250 may have a portable power supply such as a battery, which may be rechargeable, or may be powered via an electrical cable. It may also have a sound and video module which may assist in displaying video and sound and may turn off when not in use to conserve power and battery life. The computing device may also have volatile memory and non-volatile memory. The computing device may have GPS capabilities that may be a separate circuit or may be part of the processor. There also may be an input/output bus that shuttles data to and from the various user input/output devices such as a microphone, a camera, a display, or other input/output devices such as numerical or alphanumeric keypads. The computing device also may control communicating with the networks, such as a local area network (LAN), wide area network (WAN), and/or a digital communication network such as the Internet, either through wireless or wired devices. Of course, this is just one embodiment of a computing device and the number and types of portable computing devices other computing devices is limited only by the imagination.

In some embodiments, the computing device 250 may have a wired or wireless communication connection to the remote trigger 245 and/or to the one or more range finders 202 themselves. In some embodiments, the computing device 250 may act as a remote trigger to initiate a measurement by the range finders 202, and may be programmed to receive, store, and calculate measurements from or on behalf of the range finders. In some embodiments, once a measurement may be initiated with the range finders 202 either via a remote trigger 245, the computing device, or otherwise, the lengths measured between each range finder and the range target 204 may be communicated to the computing device 250 for storage. In some embodiments, the computing device 250 or software running on the computing device may calculate the average of the lengths measured by each range finder and record the average as the measured length of the fabricated part 50. In some embodiments, the range finders 202 may provide length measurements with a precision up to 0.001 inch or better.

Figure 3A:
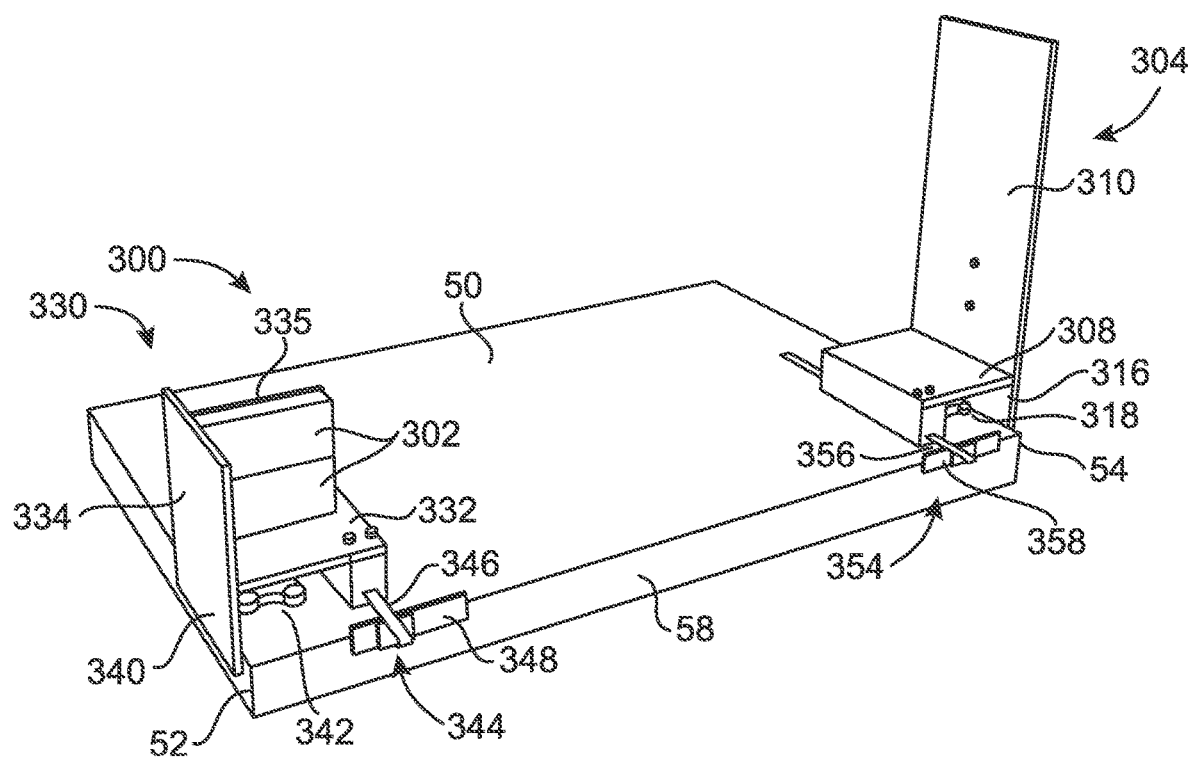
FIG. 3A shows a perspective view of another embodiment of a fabricated part measurement system with multiple range finders as shown and described herein.
Figure 3B:
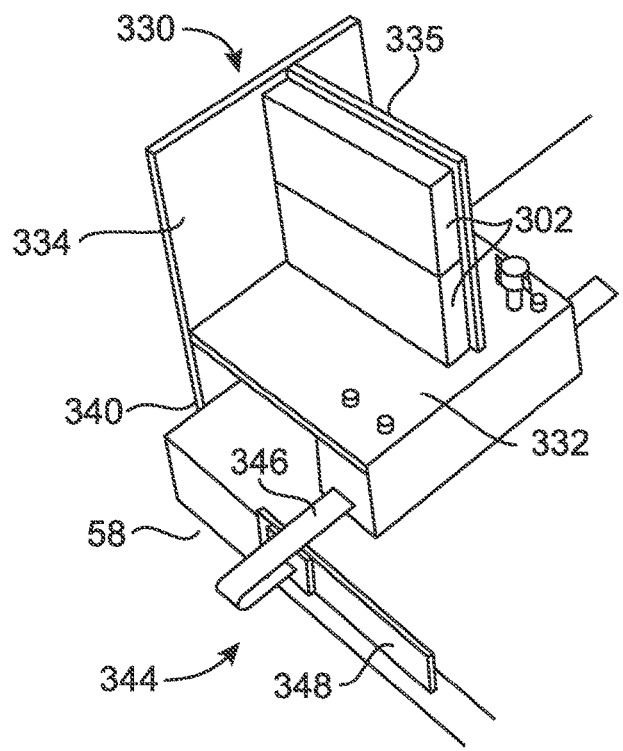
FIG. 3B shows another perspective view of a leveling fixture of the fabricated part measurement system of FIG. 3A.

FIGS. 3A and 3B provide an illustration of another embodiment of a fabricated part leveling system 300. The system 300 may be similar to system 200 described above with reference to FIG. 2, and may be used to measure an fabricated part 50 or any other component. The fabricated part 50 may have a first end 52, a second end 54 and one or more edges 58. The system 300 may include a leveling fixture 330 and a range target 304. The leveling fixture 330 may include one or more range finders 302 mounted to the leveling fixture configured to target the range target 304. In some embodiments, the range finder 302 may be a laser range finder disposed so as to emit a laser against the range target 304. The leveling fixture 330 may include a horizontal portion 332 and a vertical portion 334 substantially perpendicular to the horizontal portion. The leveling fixture 330 may include a precision stop 340 that may be configured to abut the first end 52 of the fabricated part 50, at which point the range finders may be horizontally aligned with the first end 52 and configured to take horizontal length measurements that start from a location in the same vertical plane as the first end 52. Adjustment feet 342 may be adjustable to target the range finders 302 at the range target 304. In some embodiments, the leveling fixture 330 may include a mounting plate 335 disposed perpendicularly to both the horizontal portion 332 and the vertical portion 334. The one or more range finders 302 may be mounted to the mounting plate 335 so as to orient the range finders toward the second end 54 of the fabricated part 50.

In some embodiments, the leveling fixture 330 and the range target 304 may also include an adjustment arm 344, 354 that may abut an extruded edge 58 of the fabricated part 50 and that may secure the components from moving laterally from side to side (i.e., edge to edge) on the fabricated part. In some embodiments, the adjustment arm may have an arm portion 346, 356 that may be movably disposed in, on, or through the leveling fixture 330 and the range target 304 and a stop portion 348, 358 disposed at a distal end of the adjustment arm and oriented substantially perpendicular to both the horizontal portion 332, 308 and the vertical portion 334, 310 of the leveling fixture 330 and the range target 304, respectively. The stop portion 348, 358 may be movable along or via the arm portion 346, 356 toward or away from the leveling fixture 330 or range target 304 to adjust the leveling fixture's or range target's lateral position across the fabricated part 50. For example, in the embodiment shown in FIGS. 3A and 3B, the adjustment arm 346, 356 may be movably disposed within arm orifices of the leveling fixture 330 and/or range target 304 to allow for movement of the adjustment arm 344, 354.

The range target 304 may include a horizontal portion 308 and a vertical portion 310 substantially perpendicular to the horizontal portion, and may include a target stop 316 that may be configured to abut the second end 54 of the fabricated part so as to properly align the vertical portion 310 with the second end with respect to a horizontal plane parallel to the fabricated part length. Similar to the range target 204 in FIG. 2, when the target stop 316 is positioned so as to abut the second end 54 of the fabricated part 50, the vertical portion 310 may be in the same vertical plane so as to provide a proxy target for the measurement made between the first end 52 and the second end 54. The range target 304 may also include adjustment feet 318 that may be adjusted to align the vertical portion 310 of the range target 304 to reflect range finding beams or waves emitted from the range finders 302. In some embodiments, the range finders 302 may be wirelessly triggered to take measurements and may wirelessly transmit measurements taken between the vertical portion 334 of the leveling fixture 330 and the vertical portion 310 of the range target 304 as a proxy for the length of the fabricated part 50 between the first end 52 and the second end 54.

Figure 4A:
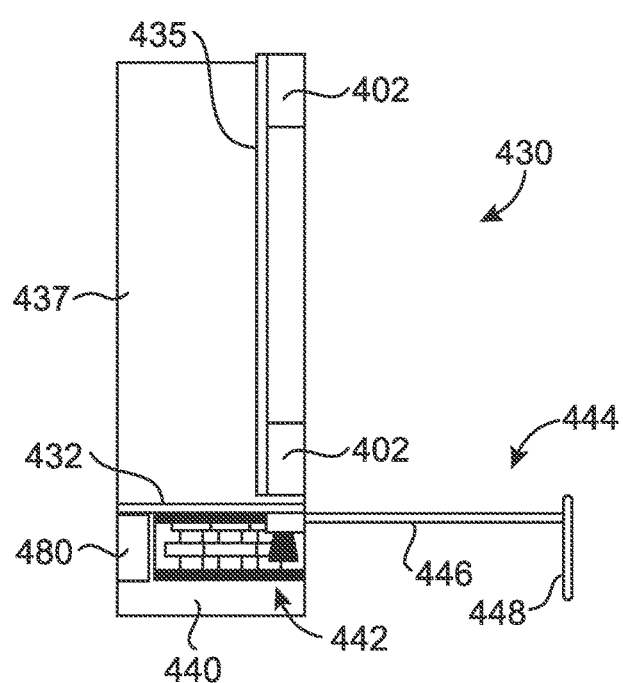
FIG. 4A shows a front elevation view of another embodiment of a leveling fixture of a fabricated part measurement system as shown and described herein.
Figure 4B:
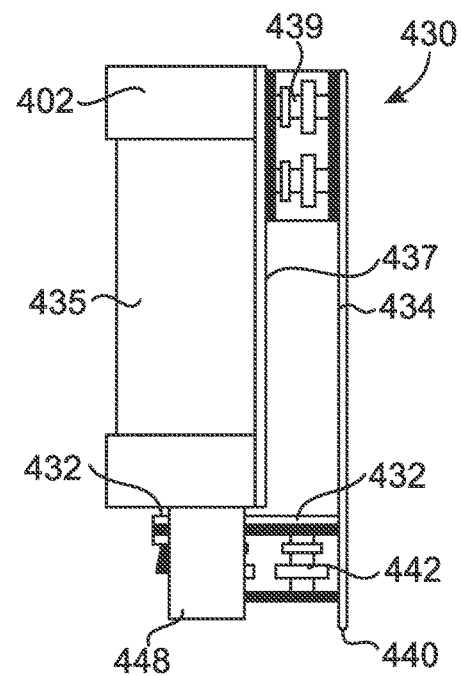
FIG. 4B shows a side elevation view of the leveling fixture of FIG. 4A.
Figure 4C:
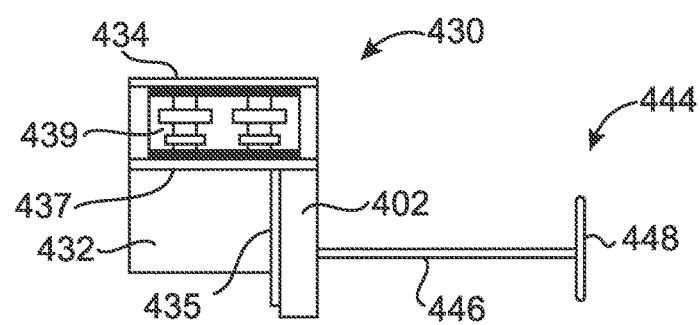
FIG. 4C shows a top view of the leveling fixture of FIG. 4A.

FIGS. 4A, 4B, and 4C are diagrams of an embodiment of a leveling fixture 430 as disclosed herein, and FIGS. 5A, 5B, and 5C are diagrams of an embodiment of a range target 404 as disclosed herein. In some embodiments, a datum structure may be used that may utilize a top face of the fabricated part and an extruded edge as primary datum surfaces. In some embodiments, the cut face of the fabricated part may also be used to position the levelling fixture 430 and the range target 404 against the fabricated part. In some embodiments, a temperature sensor 480 may be included in the levelling fixture 430. In some embodiments, temperature data from the temperature sensor may be used to calculate fabricated part cut length for a specified temperature. In the datum structure shown in FIGS. 4 and 5, Datum A may be a fabricated part plane surface, such as the top surface of a fabricated part. Datum B may be an extruded edge of the fabricated part, and Datum C may be the first end of the fabricated part, from which a measurement may be taken. In some embodiments, the adjustment feet of the levelling fixture and the range target may be positioned on Datum A. In some embodiments, an adjustment arm may positioned against Datum B to stabilize both the levelling fixture and the range target. A precision stop may be used to abut Datum C and stabilize both the levelling fixture and the range target in the proper alignment with respect to the first and second ends of the fabricated part.

FIGS. 4A, 4B, and 4C show front, side, and top views, respectively, of another embodiment of a leveling fixture 430 with feature similar to those described in reference to FIG. 3 where like reference numbers refer to like features. The leveling fixture 430 may include one or more range finders 402 mounted to the leveling fixture configured to measure distance to a range target, such as range target 304 or 404. In some embodiments, the range finder 402 may be a laser range finder disposed so as to emit a laser against the range target 404. In some embodiments, the leveling fixture 430 may include a mounting plate 435 disposed perpendicularly to both the horizontal portion 432 and the vertical portion 434. The one or more range finders 402 may be mounted to the mounting plate 435 so as to orient the range finders toward the second end of the fabricated part.

The leveling fixture 430 may include a horizontal portion 432 and a vertical portion 434 substantially perpendicular to the horizontal portion. The leveling fixture 430 may include a precision stop 440 that may be configured to abut the first end of a fabricated part, such as fabricated part 50, at which point the range finders 402 may be horizontally aligned with a first end of the fabricated part and configured to take horizontal length measurements that start from a location in the same vertical plane as the first end. The precision stop 440 may be positioned against Datum C, which may be the first end of the fabricated part, the distance from which the system may be measuring. Adjustment feet 442 may be adjustable to target the range finders 402 at the range target, and may position the leveling fixture against Datum A.

In some embodiments, the leveling fixture 430 may include an adjustable backing plate 437 that may be disposed substantially parallel to the vertical portion 434 and substantially perpendicular to the mounting plate 435. The range finders 402 may be disposed against both the mounting plate 435 and the backing plate 437. In some embodiments, one or more calibration screws 439 may be disposed between the vertical portion 434 and the backing plate 437 so as to provide for adjustments to the distance between the vertical portion and the backing plate or for adjustments to the direction that range finders are directed. For example, in some embodiments, the adjustment feet 442 may provide vertical adjustment of the range finders 402 and the calibration screws 439 may provide horizontal and/or lateral adjustment to the range finders.

In some embodiments, the leveling fixture 430 may also include an adjustment arm 444 that may abut an extruded edge of the fabricated part and that may secure the components from moving laterally from side to side (i.e., edge to edge) on the fabricated part, which may stabilize the leveling fixture 430 against Datum B. In some embodiments, the adjustment arm may have an arm portion 446 that may be movably disposed in, on, or through the leveling fixture 430 and a stop portion 448 disposed at a distal end of the adjustment arm and oriented substantially perpendicular to both the horizontal portion 432 and the vertical portion 434 of the leveling fixture 430. The stop portion 448 may be movable along or via the arm portion 446 toward or away from the leveling fixture 430 to adjust the leveling fixture's lateral position across the fabricated part.

FIGS. 5A, 5B, and 5C show front, side, and top views, respectively, of another embodiment of a range target 404 with feature similar to those described in reference to FIG.

3A where like reference numbers refer to like features. The range target 404 may include a horizontal portion 408 and a vertical portion 410 substantially perpendicular to the horizontal portion, and may include a target stop 416 that may be configured to abut a second end of a fabricated part so as to properly align the vertical portion 410 with the second end with respect to a horizontal plane parallel to the fabricated part length. When the target stop 416 is positioned so as to abut the second end of the fabricated part, the vertical portion 410 may be in the same vertical plane so as to provide a proxy target for the measurement made between a first end and the second end of a fabricated part. The range target 404 may also include adjustment feet 418 that may be adjusted to align the vertical portion 410 of the range target 404 to reflect the ranging beams, waves, etc., emitted from the range finders.

In some embodiments, the range target 404 may also include an adjustment arm 454 that may abut an extruded edge of the fabricated part and that may secure the components from moving laterally from side to side (i.e., edge to edge) on the fabricated part. In some embodiments, the adjustment arm may have an arm portion 456 that may be movably disposed in, on, or through the range target 404 and a stop portion 458 disposed at a distal end of the adjustment arm and oriented substantially perpendicular to both the horizontal portion 408 and the vertical portion 410 of the leveling fixture 430. The stop portion 458 may be movable along or via the arm portion 456 toward or away from the range target 404 to adjust the range target's lateral position across the fabricated part.

Figure 6:
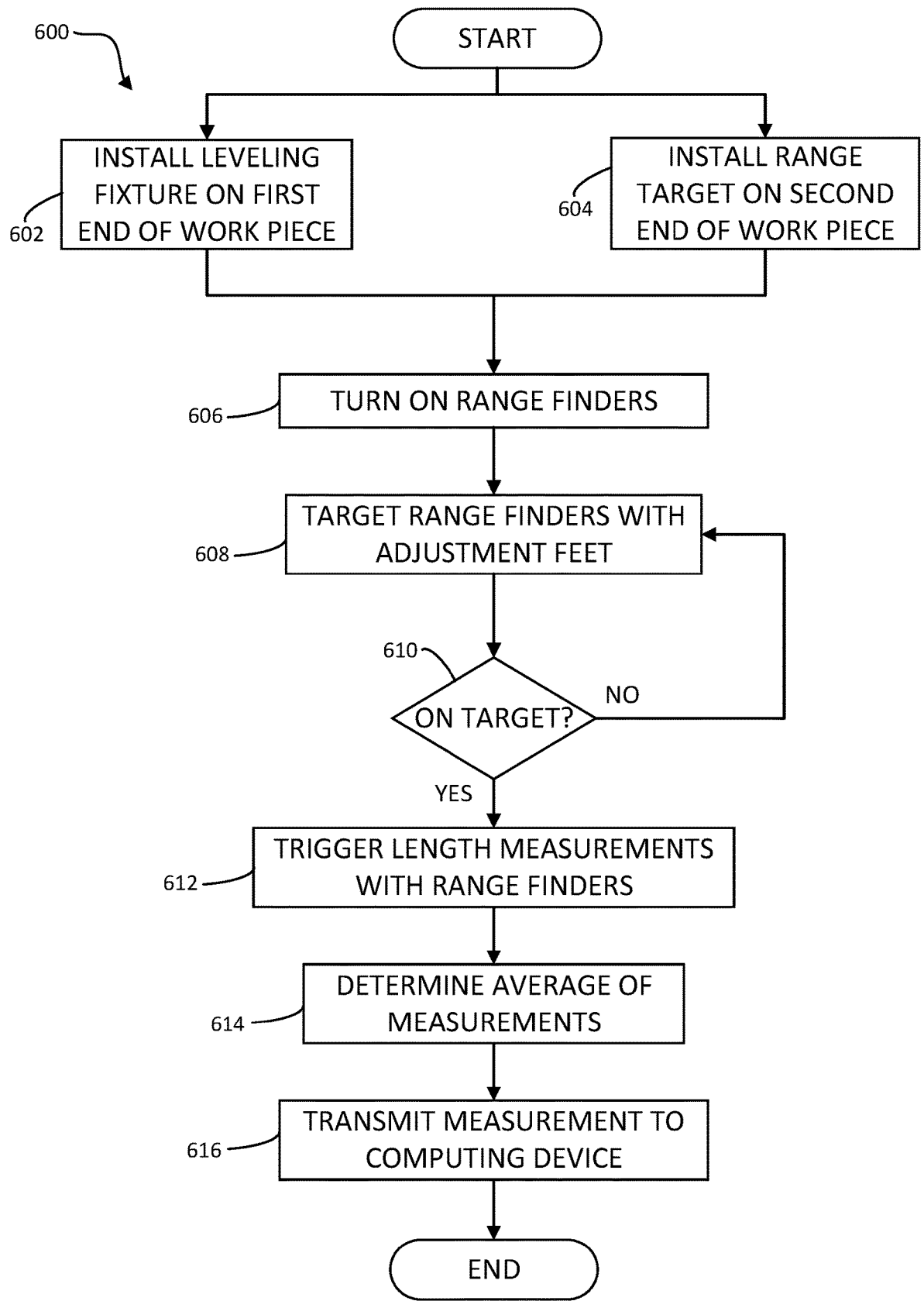
FIG. 6 shows a flow chart of an embodiment of a method for using the fabricated part measurement system shown and described herein.

In embodiments like those shown and described with respect to FIGS. 2-5, the components of the leveling systems 200 and 300 or the leveling fixture 430 and range target 504 may be relatively easily and quickly installed onto an fabricated part 50 to be measured while still providing accurate and repeatable measurements. FIG. 6 is a flow chart of an embodiment 600 of a method of using one or more of the measurement systems described herein. At 602, the method may include installing a leveling fixture on the first end of a work piece, such as a fabricated part or other manufacturing product. The leveling fixture may include one or more range finder mounted so as to be substantially aligned with the first end of the work piece and aimed substantially parallel to a length of the work piece. At 604, the method may include installing a range target on a second end of the work piece. In some embodiments, the range target may be installed so as to present a target for the range finders that may be substantially aligned with the second end of the work piece. In some embodiments, installing the leveling fixture and the range target may be leveled and/or adjusted using adjustment feet. At 606, the method may include turning on the range finders and, at 608, targeting the range finders to aim at the range target using adjustment feet. At 610, it is determined whether the range finding beams or other measuring mechanism may be striking the range target. In some embodiments, determining that the range finders are properly on target may include verifying that measurements in each range finder may be substantially equal. At 612, the method may include triggering length measurements with the range finders. This may be done via a remote triggering device or through a computing device configured to communicate with the range finders. At 614, the method may include determining the average length measurement between all of the range finders and, at 616, transmitting that average measurement to a computing device for recording. In some embodiments, all of the measurements may be transmitted to the computing device for recording, or the computing device itself may determine the average of each of the measurements received.

Figure 7:
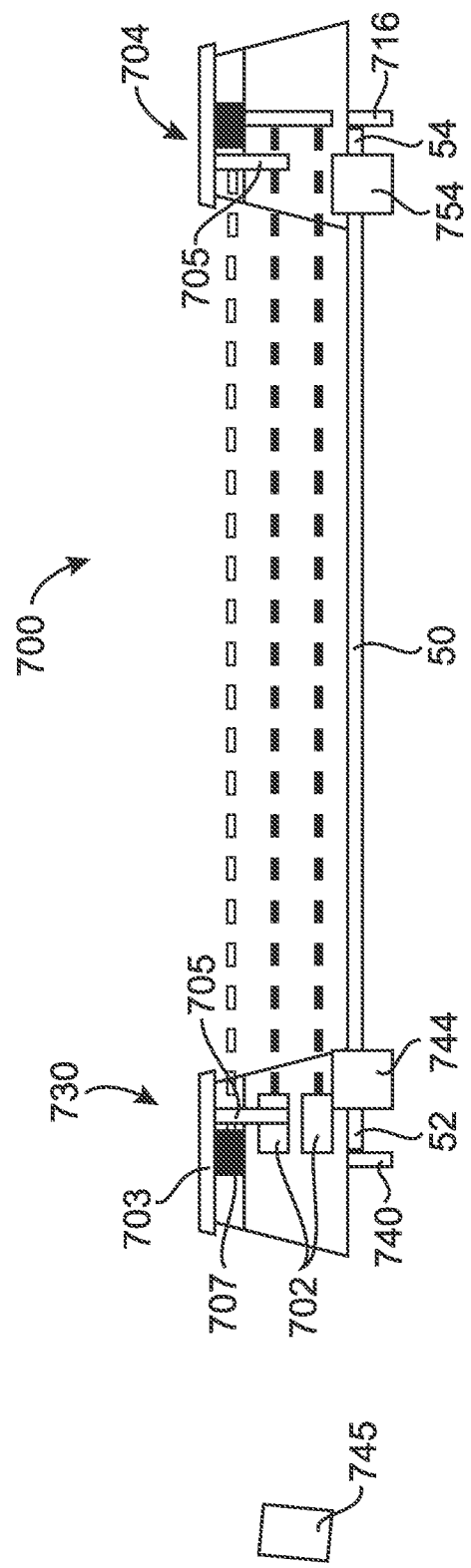
FIG. 7 shows another embodiment of a fabricated part measurement system as shown and described herein.

FIG. 7 shows another embodiment of a measurement system 700 that may use range finders 702 mounted on a leveling fixture 730 to automatically detect a range target 704 and adjust the orientation of the leveling fixture accordingly. In some such embodiments, a rotary laser 703 may have a core 707 upon which the ranger finders 702 are attached. In such embodiments, a laser detector 705 may be used to set the grade of the rotary laser 703, which may be used to automatically adjust both the range target 704 and levelling fixture 730 including the range finders 702. In such embodiments, the orientation of the components may be made automatically once the levelling fixture 730 and the range target 704 are positioned at the first and second ends of a fabricated part. To do so, the rotary laser 703, a line laser, or a pulse laser may automatically detect and orient the range finders 702 at the range target 704 for measurements to be made. The measurement system 700 may also include a remote trigger 745 that may control and/or trigger the laser ranger finders 702. The levelling fixture 730 may also include a precision stop 740 and an adjustment arm 744 to position the levelling fixture against the first end 52 of the fabricated part 50. The range target 704 may also include a precision stop 716 and an adjustment arm 754 to position the range target against the second and 54 of the fabricated part 50. In some embodiments, the range target 704 may also have a core with rotary range finders attached to automatically align with respect to the fabricated part.

The foregoing description and drawings merely explain and illustrate the invention and the invention is not limited thereto. While the specification is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:

1. A system for measuring a length of a work piece, the system comprising:
   a leveling fixture configured to be disposed at a first end of the work piece, the leveling fixture including:
      a precision stop configured to abut against the first end of the work piece,
      a plurality of range finders each configured to take measurements with respect to the first end of the work piece when the precision stop abuts the first end of the work piece,
      a fixture adjustment arm configured to abut an edge of the work piece that is substantially perpendicular to the first end to secure the leveling fixture from moving laterally from side to side, and
      a plurality of adjustment feet that are adjustable to aim the range finder; and
   a range target configured to be disposed at a second end of the work piece, the range target including:

a target stop configured to abut against the second end of the work piece, a vertical portion configured to be substantially aligned with the second end of the work piece when the target stop abuts the second end of the work piece, and a target adjustment arm configured to abut an edge of the work piece that is substantially perpendicular to the second end to secure the range target from moving laterally from side to side;

wherein the plurality of range finders are each configured to take distance measurements between the first end and the second end of the work piece to measure the length of the work piece.

2. The system of claim 1, wherein the plurality of range finders is two range finders.

3. The system of claim 1 further comprising a remote trigger in communication with one or more of the plurality of range finders configured to remotely trigger a measurement by one or more of the plurality of range finders.

4. The system of claim 1 further comprising a computing device in wireless communication with one or more of the plurality of ranger finders, wherein the plurality of range finders are configured to transmit measurements to the computing device.

5. The system of claim 4, wherein the computing device is configured to receive the distance measurement from each of the plurality of range finders and determine an average length of the work piece.

6. The system of claim 1, wherein each of the leveling fixture and the range target is constrained in the X, Y, and Z axes.

\* \* \* \* \*